(12) United States Patent
Thebault et al.

(10) Patent No.: US 7,063,886 B2
(45) Date of Patent: Jun. 20, 2006

(54) THERMOSTRUCTURAL COMPOSITE STRUCTURE WITH A COMPOSITIONAL GRADIENT AND ITS MANUFACTURING PROCESS

(75) Inventors: Jacques Thebault, Bordeaux (FR); Laurent David, Blanquefort (FR)

(73) Assignee: Snecma Propulsion Solide, Le Haillan (FR)

( * ) Notice: Subject to any disclaimer, the term of this patent is extended or adjusted under 35 U.S.C. 154(b) by 193 days.

(21) Appl. No.: 10/727,472

(22) Filed: Dec. 4, 2003

(65) Prior Publication Data
US 2005/0013985 A1    Jan. 20, 2005

(30) Foreign Application Priority Data
Jul. 18, 2003    (FR) .................................. 03 08787

(51) Int. Cl.
*B32B 3/26*    (2006.01)
(52) U.S. Cl. ................ 428/304.4; 428/306.6; 428/310.5; 428/311.51; 428/313.3; 428/316.6; 428/318.4; 428/313.9; 428/312.6; 428/912.2
(58) Field of Classification Search ............ 428/304.4, 428/306.6, 310.5, 311.51, 313.3, 316.6, 318.4, 428/313.9, 312.6, 912.2
See application file for complete search history.

(56) References Cited

U.S. PATENT DOCUMENTS

| 4,856,887 A | 8/1989 | Wakugawa et al. ......... 350/641 |
| 6,187,123 B1 | 2/2001 | Chenier et al. |

FOREIGN PATENT DOCUMENTS

| DE | 25 12 597 A1 | 9/1976 |
| EP | 0735387 | 2/1996 |
| EP | 1 184 356 A1 | 3/2002 |

OTHER PUBLICATIONS

Translation of DE- 2512597.*

* cited by examiner

*Primary Examiner*—Ling Xu
(74) *Attorney, Agent, or Firm*—Weingarten, Schurgin, Gagnebin & Lebovici LLP

(57) ABSTRACT

Thermostructural composite structure having a compositional gradient, formed from a porous core (5) made of a refractory having a pore volume content of greater than or equal to 80%. The core (5) lies between two intermediate layers (6a, 6b) comprising the carbon fiber reinforcement, densified by a matrix composed of the carbon phase and of a ceramic phase, and a refractory solid filler. Two monolithic ceramic shells (7a, 7b) cover the intermediate layers in order to give stiffness to the entire structure.

12 Claims, 7 Drawing Sheets

THERMOSTRUCTURAL COMPOSITE STRUCTURE WITH A COMPOSITIONAL GRADIENT AND ITS MANUFACTURING PROCESS

This application claims priority to a French application No. 03 08787 filed Jul. 18, 2003.

BACKGROUND OF THE INVENTION

Thermostructural composites are known for their good mechanical properties and their ability to maintain these properties at high temperature. They comprise carbon/carbon (C/C) composites formed from a carbon-fiber reinforcement densified by a carbon matrix and ceramic matrix composites (CMC) formed from a reinforcement made of refractory (carbon or ceramic) fibers densified by an at least partly ceramic matrix. Examples of CMCs are C/SiC composites (carbon fiber reinforcement and silicon carbide matrix), C/C—SiC composites (carbon fiber reinforcement and matrix comprising a carbon phase, generally as close as possible to the fibers, and a silicon carbide phase) and SiC/SiC composites (silicon carbide reinforcing fibers and silicon carbide matrix). An interphase layer may be interposed between reinforcing fibers and matrix in order to improve the mechanical integrity of the material.

Because of their properties, thermostructural composites find applications in various fields, to produce components that have to be subjected to high thermomechanical stresses, for example in the aeronautical and space fields. However, in such fields, although the composites have already allowed components to be produced with good mechanical strength with a lower weight than metals for example, the mass of these components is not insignificant and has an influence on the performance of the systems. Consequently, there is still a demand for lighter thermostructural components or assemblies, but without the mechanical properties suffering.

One solution consists in forming lightened thermo-structural structures, for example of the cellular type, such as honeycomb structures, rather than solid structures, so as to retain good mechanical strength but with less material. This implies being able to manufacture thin-walled thermostructural composite structures of complex shape.

When it is desired to obtain a component of a particular shape from a thermostructural composite, the procedure is generally as follows. A preform is produced by forming the fibrous reinforcement. The preform, optionally kept in shape by means of a tool, is then densified. A component made of a rigid composite with a defined shape is thus obtained.

The usual densification processes are the liquid process and the gas process.

The liquid process consists in pre-impregnating the preform with a liquid composition containing a precursor of the material of the matrix. The precursor is usually in the form of a polymer, such as a resin, optionally diluted in a solvent. The conversion of the precursor into carbon or ceramic is carried out by heat treatment, after removal of the optional solvent and crosslinking of the polymer. Several successive impregnation cycles may be carried out in order to achieve the desired degree of densification. To give an example, liquid carbon precursors may be resins with a relatively high coke content, such as phenolic resins, whereas liquid ceramic precursors, especially those based on SiC or $Si_3N_4$, may be resins of the polycarbosilane (PCS) or polytitanocarbosilane (PTCS) type.

The gas process consists of chemical vapor infiltration. The fibrous preform corresponding to a component to be produced is placed in a furnace into which a reactive gas phase is introduced. The pressure and the temperature in the furnace and the composition of the gas phase are chosen so as to allow the gas phase to diffuse into the pores of the preform in order to form therein the matrix by deposition, in contact with the fibers, of a solid material resulting from the decomposition of a constituent of the gas phase or from a reaction between several constituents. To give an example, gaseous carbon precursors may be hydrocarbons, that give carbon by cracking, and a gaseous ceramic precursor, especially SiC precursor, may be methyltrichlorosilane (MTS), that gives SiC by decomposition of the MTS. In this case, the optional tools used to keep the preform in a defined configuration must be suitable for allowing the gases to pass into the preform to be treated.

However, these manufacturing methods do not allow complex components having very thin parts of precise shape and dimensions to be obtained directly.

Detailed parts may be machined in the component after densification. In this case, to maintain sufficient stiffness in the thin parts, the composite used must be very strong, that is to say have a high density. For this purpose, it is possible to use composites with a ceramic matrix, such as silicon carbide, which gives the composite a high stiffness even when it has a small thickness. However, the weight saving obtained by removing material is limited by the required density of the composite used.

Moreover, the use of very hard materials such as silicon carbide requires the use of specific tools that allow precision machining of such materials, and this increases the difficulties and the costs of manufacture.

SUBJECT AND SUMMARY OF THE INVENTION

The objectives of the present invention are to remedy the aforementioned drawbacks and to manufacture a thermostructural composite structure making it possible to produce thin-walled complex shapes that are both stiff and light.

These objectives are achieved by a thermostructural composite structure having a compositional gradient, formed from a porous core made of a refractory having a pore volume content of greater than or equal to 80%, the core lying between two intermediate layers comprising part of the refractory, a ceramic phase and a refractory solid filler, two external shells made of monolithic ceramic covering the intermediate layers.

Thus, the structure of the invention has the advantage of being light while still having a high stiffness, whatever its dimensions. This stems from the fact that the structure has a density gradient through the thickness. To be specific, the structure has a very low density at its center and a much higher density near its surface. Consequently, the structure has on the surface the stiffness of a ceramic, while having a mean density much lower than that of a pure ceramic, or of a ceramic matrix composite. In addition, the structure has good mechanical strength since the part having the highest Young's modulus, namely the ceramic shell, lies on the surface and since this shell is firmly implanted in the intermediate layer that is in turn attached to part of the core. The intermediate layers and the porous core, on the one hand, and the ceramic shells and the intermediate layers, on the other, partly interpenetrate so as to anchor the intermediate layers in the porous core and the ceramic shells in said intermediate layers.

The mean density/stiffness pair of the structure may be adjusted by varying the different thicknesses of the layers.

Typically, the structure of the invention has a bulk density of less than 1, corresponding to a mass-density less than 1000 kg/m$^3$ or 1 gm/cm$^3$.

The structure according to the invention can be used for all kinds of constructions. It may include cavities, the walls of which form stiffeners in order to form a strong lightened structure. The stiffeners may have a wall thickness of less than 1 mm and down to 0.5 mm. To further lighten the structure, the stiffeners may have hollowed-out portions.

The constituent material of the core may be any type of refractory provided that it is porous and machinable. The materials used may, for example, be carbon, silicon carbide, alumina, etc. They may be in various forms, such as a foam or a composite comprising a fibrous reinforcement consolidated by a matrix. In the case of a carbon fiber reinforcement, the fibers are preferably carbon fibers of the ex-rayon type, allowing them to limit the stresses due to the differential dimensional variations because of the presence in the structure of materials having different thermal expansion coefficients. Cracking of the monolithic ceramic shells may thus be avoided.

The structure may furthermore have a polished surface formed integrally with the stiffeners. It is thus possible to obtain an ultralight mirror with a very low moment of inertia. In addition, because of the nature of the materials, the mirror has a low thermal inertia and a high thermal conductivity because of the presence of SiC on the surface, thereby making it possible to avoid the presence of hot spots in the structure and to have homothetic deformations that guarantee precise guiding even in the case of a temperature variation. Mirrors with very large dimensions and a relatively low mass may thus be manufactured.

The ceramic of the shell may be composed inter alia of silicon carbide (SiC), boron (B) or boron carbide (B$_4$C).

The subject of the invention is also a process for manufacturing a laminated thermostructural composite structure, comprising the following steps:

a) machining of a preform in a porous refractory component, the preform having a pore volume content of greater than or equal to 80%;

b) application of a liquid composition, containing a ceramic precursor polymer and a refractory solid filler, to all the accessible surfaces of the preform and conversion of the precursor polymer into a ceramic in order to reduce the porosity at the surface of the preform; and c) formation of a ceramic coating by chemical vapor infiltration so as to form a ceramic shell over all the surfaces of the preform.

Thus, rigid structures of complex shapes with very thin elements may be easily produced using the process of the invention. This is because, because of its high porosity, the starting composite may be easily machined, precisely and with very small dimensions. Thus, the process starts right away with a preform having a shape similar to the final shape of the component to be produced.

The intermediate layer serves not only as a barrier for preserving the porosity of the core of the structure during gas infiltration, but also as implantation layer in order to anchor the ceramic coating and provide mechanical linkage between the ceramic shell and the porous core.

The preform is machined to the shape and dimensions of the component that it is desired to produce. The machining may include the hollowing-out of cavities in the composite component in order to form stiffeners.

The machining operation may also include the formation of a substantially flat surface that is then polished after the chemical vapor infiltration step, in order to form an optical surface. Thus, an ultralight mirror is obtained whose surface may be formed integrally with stiffeners, giving it a very low mass.

The constituent material of the preform may be any type of refractory provided that it is porous and machinable. The materials used may, for example, be carbon, silicon carbide, alumina, etc. They may be in various forms, such as a foam or a composite comprising a fibrous reinforcement consolidated by a matrix.

In the case of a composite comprising with [sic] fibrous reinforcement, the fibers of the reinforcement may be carbon fibers of the ex-rayon type, thereby making it possible to limit the stresses due to the differential dimensional variations because of the presence in the structure of materials having different thermal expansion coefficients.

The liquid composition preferably comprises a polymer solvent [sic] of the ceramic precursor, the amount of solvent being chosen so as in particular to adjust the viscosity of the composition.

The liquid composition may be applied by brushing it on or using another method, for example spraying. It may be applied as several successive layers. After each layer, the ceramic precursor polymer may undergo intermediate crosslinking.

The ceramic obtained by liquid processing may be SiC, the ceramic precursor polymer then possibly being chosen from PCS and PTCS—SiC precursors—or else from silicones. Other ceramics may be obtained by liquid processing, such as silicon nitride Si$_3$N$_4$ from polysilazane pyrolyzed in ammonia gas or boron nitride BN from polyborazine.

The solid filler may comprise a refractory powder, especially a ceramic powder such as a carbide (especially SiC) powder, nitride powder or boride powder. The particle size of the powder is chosen so that the particles have a mean size of preferably less than 100 microns, for example between 5 and 50 microns.

The particle size is in fact chosen so that the powder particles have a small enough size to penetrate the surface pores of the composite, but not too small however to allow surface diffusion of gas into the preform during the subsequent chemical vapor infiltration step. In this way, good attachment of the coating formed during this subsequent chemical vapor infiltration step may be achieved by anchoring in the surface pores of the material. According to one particular advantageous feature of the process, a blend of ceramic powders having at least two different mean particle sizes is used so as to fulfil these conditions.

The amount by weight of each solid filler in the liquid composition is preferably between 0.4 and 4 times the amount by weight of ceramic precursor polymer.

The coating formed by chemical vapor infiltration may be of silicon carbide (SiC) but also boron (B) or boron carbide (B$_4$C).

BRIEF DESCRIPTION OF THE DRAWINGS

Other features and advantages of the invention will become apparent from the following description of particular ways of implementing the invention, these being given by way of nonlimiting examples and with reference to the appended drawings in which.

DETAILED DESCRIPTION OF AN EMBODIMENT

Depending on the applications envisioned, the shape and the dimensions of the components that can be obtained with the structure of the present invention may vary. For the sake of simplification, the embodiments described below are merely examples of possible applications of the invention. A person skilled in the art will without any difficulty conceive of other embodiments in which the structural characteristics of the components obtained according to the invention may be advantageously used.

Figure 1:
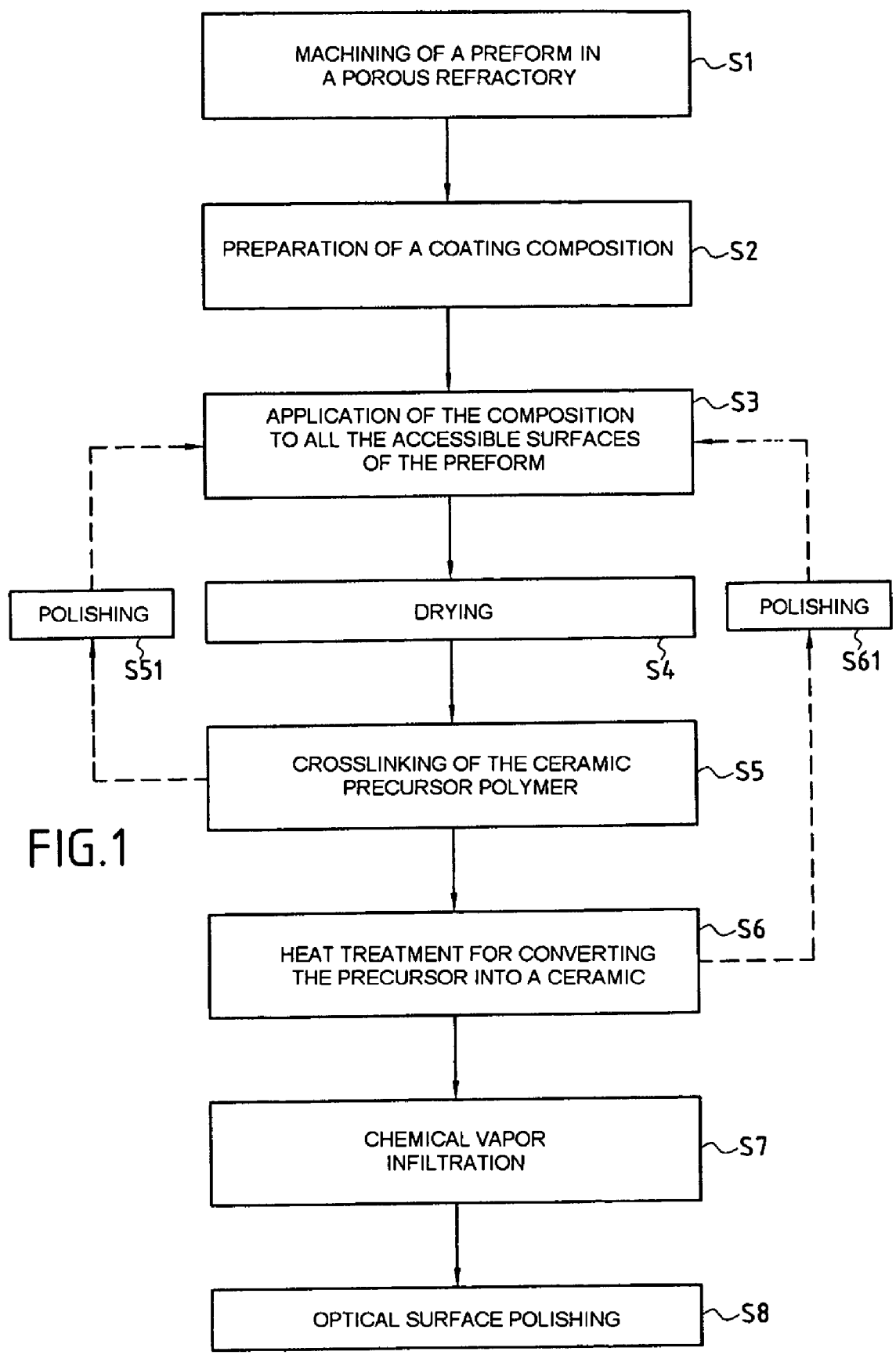
FIG. 1 is a flowchart illustrating the successive steps of one way of implementing a process according to the invention.

Referring to FIG. 1, one method of implementing a process for manufacturing a structure according to the invention comprises the following steps.

The first step (step S1) consists in machining a preform in an initial thermostructural composite that has a very low density but is strong enough to allow it to be machined.

Many materials may be used to produce the preform. Generally speaking, any refractory, porous, low-density machinable material can be used. As examples, mention may be made of C/C or C/SiC composites formed from a fibrous reinforcement or carbon or silicon carbide foams that have a pore volume content of greater than or equal to 80%.

In the example described below, a carbon/carbon (C/C) composite formed from a carbon fiber reinforcement predensified or consolidated by a carbon matrix is used. This composite can be easily machined, for example by milling, allowing complex thin-walled shapes to be produced.

The reinforcement is formed from a fiber felt having a relatively low fiber content. The fibers are preferably carbon fibers of the ex-rayon type, which limit the stresses due to differential dimensional variations because of the presence, in the final structure, of materials having different thermal expansion coefficients. This type of material may be supplied in the form of rigid felt panels such as, for example, the insulation material CVD 40 distributed by Calcarb Limited.

The fibers are bonded together by a carbon matrix. The consolidation of the reinforcement may be carried out using a liquid, by impregnating said reinforcement with a liquid composition containing a carbon precursor and then carbonizing it at a controlled temperature and controlled pressure.

Alternatively, the consolidation may be carried out using a gas. In this case, the reinforcement is placed in a furnace into which a reactive gas phase is introduced. The pressure and the temperature in the furnace and the composition of the gas phase are chosen so as to allow the gas phase to diffuse into the pores of the preform in order to form therein the matrix by deposition, in contact with the fibers, of a solid material resulting from the decomposition of a constituent of the gas phase or from a reaction between several constituents.

Whatever the process used to consolidate the fibrous reinforcement, the densification must be adjusted in order to mechanically bond the carbon fibers at least at the points where they intersect with the matrix, while maintaining a pore volume content of the resulting composite that is greater than or equal to 80%.

A porous C/C composite, such as CVD 40 distributed by Calcarb Limited, is thus obtained that has, at this stage, a very low density of between 0.2 and 0.4 while having sufficient strength to be machined. Such a composite allows walls having a thickness of less than 1 mm and possibly down to 0.5 mm to be machined.

Figure 2:
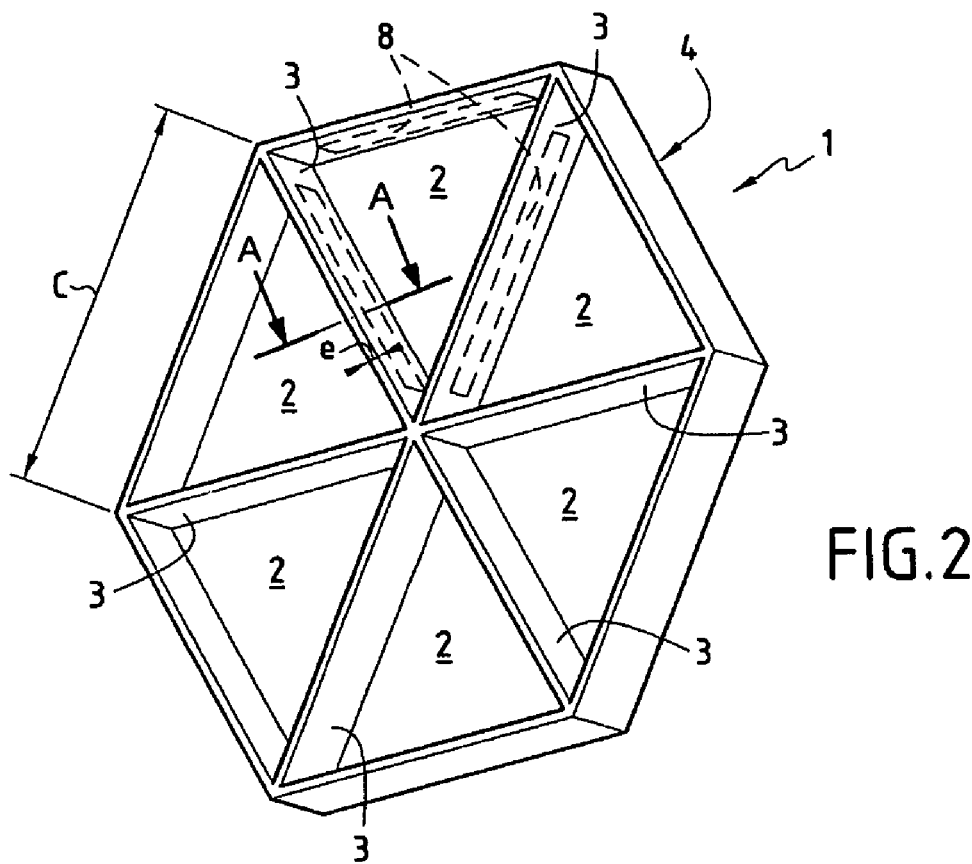
FIGS. 2 and 3 are perspective views of an example of a preform according to a first embodiment of a structure according to the invention.
Figure 3:
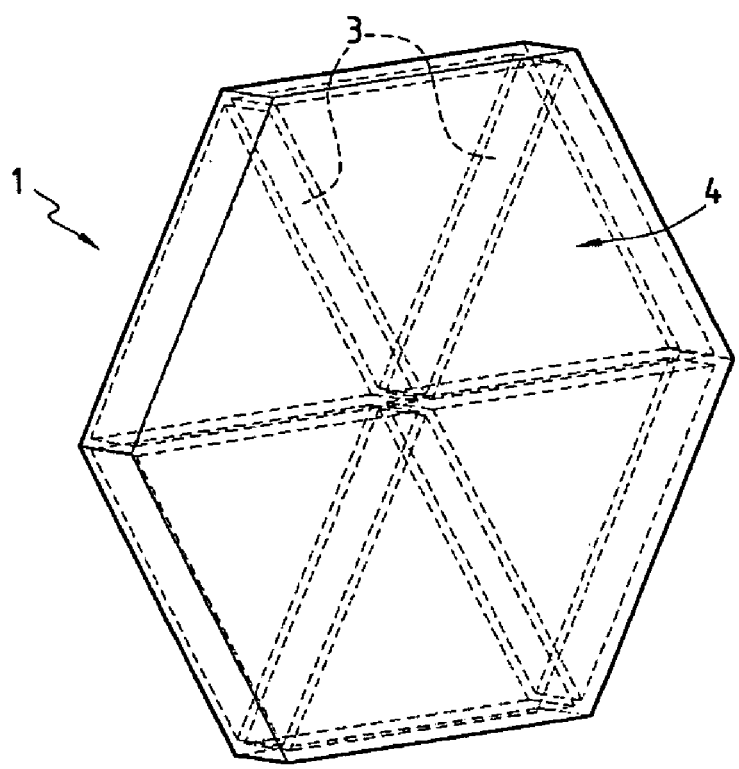

The machining of the preform is carried out directly in the composite. FIGS. 2 and 3 show a first example of a preform 1 intended for the manufacture of an ultralight mirror. The general shape of the component is firstly machined in the C/C composite described above. Recesses 2 are then machined in the composite in order to lighten the structure and form triangular cavities (FIG. 2). The remaining vertical walls form stiffeners 3, while the remaining part that is not hollowed-out forms an approximately plane surface 4 that will become the optical surface (FIG. 3).

Figure 4:
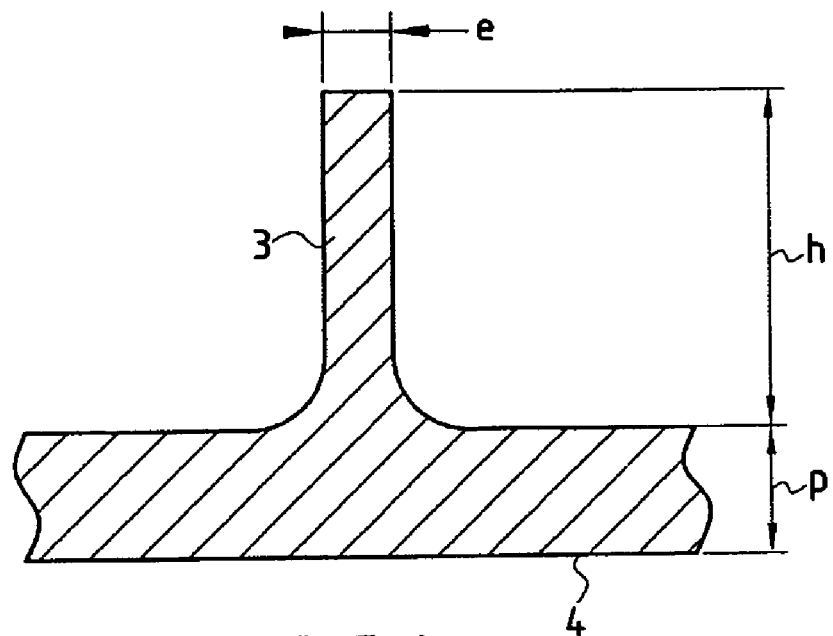
FIG. 4 is a sectional view of a first type of stiffener of a structure according to the invention.
Figure 5:
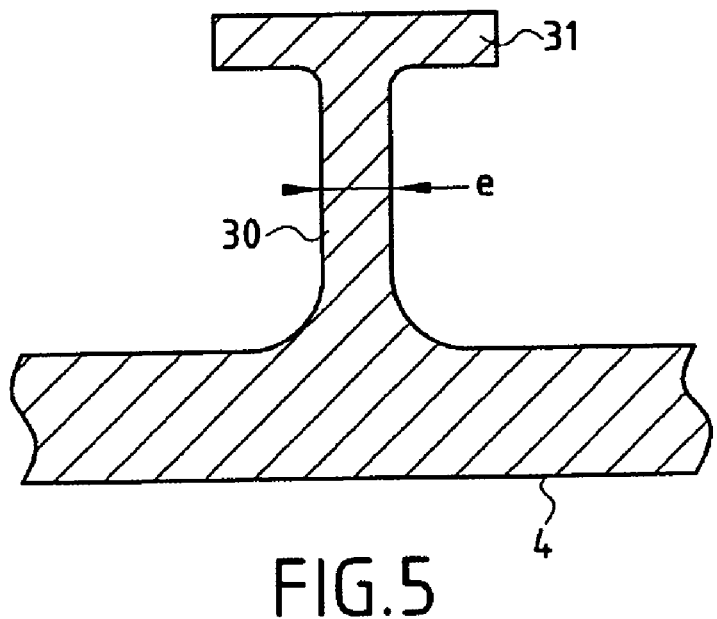
FIG. 5 is a sectional view of a second type of stiffener of a structure according to the invention.

To give an example, the stiffeners have a length C of between 25 and 50 mm and a thickness e of between 0.3 and 1 mm. FIG. 4 shows a sectional view of the stiffeners 3 of the preform of FIG. 2. The stiffeners 3 have a height h of between 15 and 40 mm, the surface 4 having a thickness p of between 1 and 5 mm. To optimize the geometrical stiffness of the structure, stiffeners 30, such as those illustrated in FIG. 5, may be machined instead of the simple stiffeners of FIG. 4. A band of material 31 is preserved at the end of the stiffeners 30, which then have a T-shaped cross section.

Moreover, the stiffeners may also be partly hollowed-out so as to further lighten the preform. In this case, as illustrated in FIG. 2, the walls that form the stiffeners 3 may have openings 8.

Once the machining of the preform has been completed, a coating composition, comprising a refractory solid filler in the form of a powder, especially a ceramic powder, a ceramic precursor polymer and an optional solvent for the polymer, is prepared (step S2).

In the method of implementation described here, the powder is an SiC powder. However, other, especially ceramic, powders may be used that have approximately the same particle sizes, for example those chosen from carbide (other than SiC), nitride or boride powders, it being possible for powders of different types to be blended.

Since the thermostructural material is a C/C composite, the use of a powder having a lower expansion coefficient than SiC, for example an $Si_3N_4$ powder, may be envisioned so as to match the subjacent material and limit the risk of cracking.

The particle size is chosen to be sufficiently fine to allow the powder particles to penetrate the surface pores to be filled of the composite of the preform. The particle size is, however, not chosen to be too fine so as to allow diffusion of the gases into the surface pores of the composite during a subsequent chemical vapor infiltration step. In this way, good attachment of the coating formed during this subsequent chemical vapor infiltration step may be obtained by anchoring in the surface pores of the composite, while limiting the depth of diffusion of the infiltration into the composite.

Preferably, the mean particle size is then chosen to be less than 100 microns, for example between 5 and 50 microns. It will be possible to use powders of different particle sizes, the smaller particles contributing to good reduction in the surface porosity and the coarser particles contributing to leaving passages for gas diffusion. For example, it is possible to use particles with a mean size of between 5 microns and 15 microns in combination with particles with a mean size of between 25 microns and 50 microns, the proportion by weight of particles with the larger mean size being, for example, at least equal to that of the particles having a smaller mean size.

The ceramic precursor polymer is chosen depending on the nature of the coating desired. In the case of an SiC coating, the polymer is chosen, for example, from polycarbosilane (PCS) and polytitanocarbosilane (PTCS).

Other ceramic precursor polymers can be used, for example silicones, which are SiC (or SiC+C, with excess carbon) precursors, polysilazanes which, pyrolyzed in ammonia gas, allow $Si_3N_4$ to be obtained, and polyborazines, which are BN precursors.

It will be noted that the constituent ceramic of the solid fillers and that for which the polymer is a precursor are preferably, but not necessarily, of the same type.

The solvent is determined according to the ceramic precursor polymer used. In the case of PCS for example, the solvent may be xylene. Other solvents can be used for other polymers, for example heptane, hexane or ethanol in the case of silicones.

The amount of solid filler, relative to that of the ceramic precursor polymer, is chosen to ensure that the surface pores of the thermostructural composite material are satisfactorily filled, while ensuring that the composition penetrates to a certain depth. Thus, the amount of solid filler by weight is preferably between 0.4 times and 4 times the amount of ceramic precursor polymer by weight.

The amount of solvent used is chosen in order to give the liquid composition the appropriate viscosity for the purpose of applying it to the surface of the component. It also allows the degree of penetration of the liquid composition to be adjusted.

As an example, a typical composition for a composition intended for the formation of an SiC coating may be chosen within the following limits:

| | |
|---|---|
| SiC powder (mean particle size between 5 and 50 microns): | between 2 and 7 parts by weight; |
| PCS (SiC precursor): | between 1 and 3 parts by weight; |
| Xylene (solvent for PCS): | between 2 and 5 parts by weight. |

The liquid composition is applied to all the accessible surfaces of the component (step S3) so as to entirely cover the latter.

The application may be simply carried out using a brush. Other methods, for example spraying, may be used.

After drying (step S4), for example in air or in an oven, in order to remove the solvent, the crosslinking of the ceramic precursor polymer is carried out (step S5). The crosslinking may be carried out by a heat treatment. In the case, for example, of PCS, the temperature is gradually raised up to a temperature hold of about 350° C.

The crosslinked polymer is subjected to a heat treatment for the purpose of ceramifying it (step S6). In the case of PCS, the conversion to SiC is accomplished by progressively raising the temperature up to a temperature hold of about 900° C.

Several successive layers of the liquid composition may be applied. After application of each layer, the process preferably involves at least the drying of the composition and the crosslinking of the ceramic precursor polymer. Ceramification may be carried out simultaneously for all the layers. A mechanical (abrasion) prepolishing step may be carried out after each application between two crosslinking operations (step S51) or ceramification operations (step S61) so that each layer has a uniform thickness.

Of course, the crosslinking and ceramification conditions may be different with other ceramic precursors, these conditions in no way being novel in character.

The preform then has, on all its external surfaces, a coating layer that at least partly closes off the macropores of the material of the preform over a limited distance starting from the surface of the component. The component thus includes a layer of lower porosity in the vicinity of its surface compared with its initial porosity, that is still present at the center of the component and that forms the core of the structure. This intermediate coating layer constitutes a barrier that limits the diffusion of gases in order to preserve the porosity of the core and allow the formation of a surface coating during the chemical infiltration step.

After ceramification, a ceramic coating is deposited by chemical vapor infiltration (step S7) on all the external surfaces of the component. This coating makes it possible to progressively fill the residual pores, to consolidate the assembly formed by the phase resulting from the crosslinking of the precursor and the solid filler, and to form a uniform ceramic coating, that forms a ceramic shell on all the external surfaces of the component. This shell gives the entire structure the necessary stiffness.

The infiltration operation is carried out in a furnace into which a gaseous ceramic, especially SiC, precursor, such as methyltrichlorosilane (MTS), is introduced, resulting in SiC by decomposition of the MTS. The monolithic SiC thus obtained has a Young's modulus of about 420 GPa, which gives the surface of the component a high stiffness. However, other gaseous ceramic precursors may be used, depending on the desired stiffness or on other properties.

The nature of the reactive gas phases and the pressure and temperature conditions necessary for obtaining various ceramic coatings by chemical vapor infiltration are well known per se.

The diffusion of the gaseous precursor into the preform, in order to form therein the matrix by deposition on contact with the fibers, essentially takes place within the coating layer. Because of their small size and limited number at this point, the pores are rapidly blocked by the matrix coating. Consequently, the diffusion of gases more deeply into the material is hampered and a coating then forms on the surface of the component. This coating is firmly anchored in the initial pores of the coating layer, which in turn is anchored to the material of the core of the structure.

Because of the fact that the initial roughness of the component was largely compensated for, it is possible to obtain a coating with a smooth appearance without requiring a large coating thickness. Preferably, this thickness is less than 100 microns, for example between 50 microns and 100 microns. Furthermore, the chemical vapor infiltration process allows a coating of controllable uniform thickness to be obtained, hence the possibility of precisely controlling the final dimension of the component.

Figure 6:
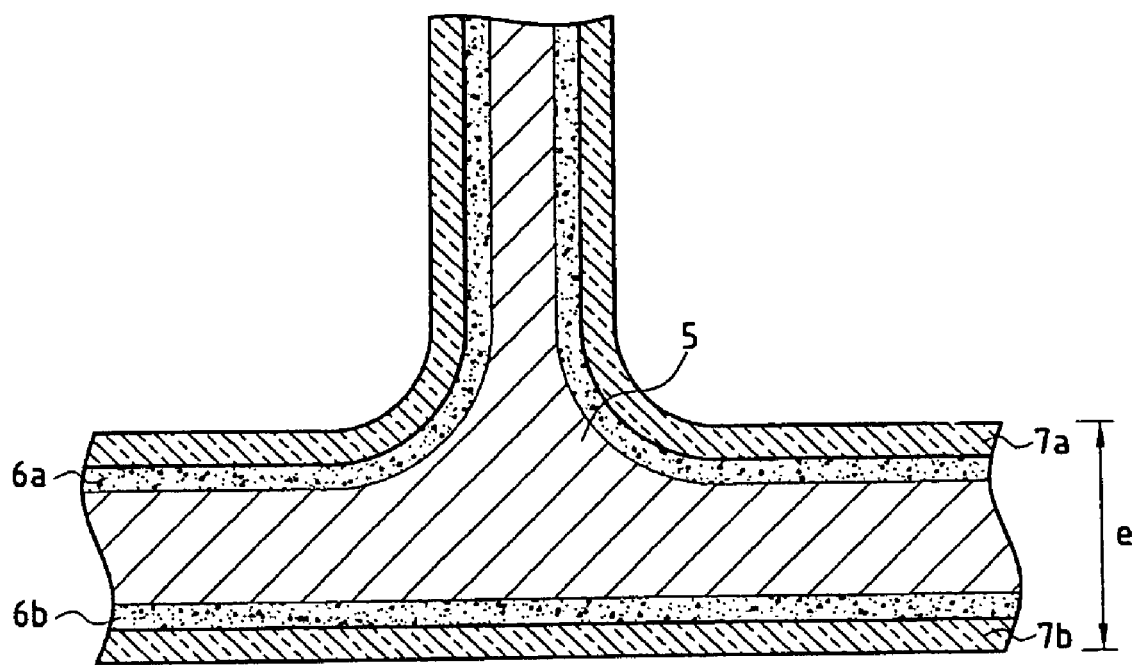
FIG. 6 is a partial schematic representation in cross section of the structure according to the invention.

As shown highly schematically in FIG. 6, which repeats the sectional view of FIG. 4, a laminated structure is therefore obtained which comprises a core 5 essentially made of porous C/C composite sandwiched between two intermediate layers 6a and 6b comprising mainly one part of the C/C composite, the matrix of which is furthermore composed of a ceramic phase and solid filler, and two ceramic layers or shells 7a and 7b.

Figure 7A:
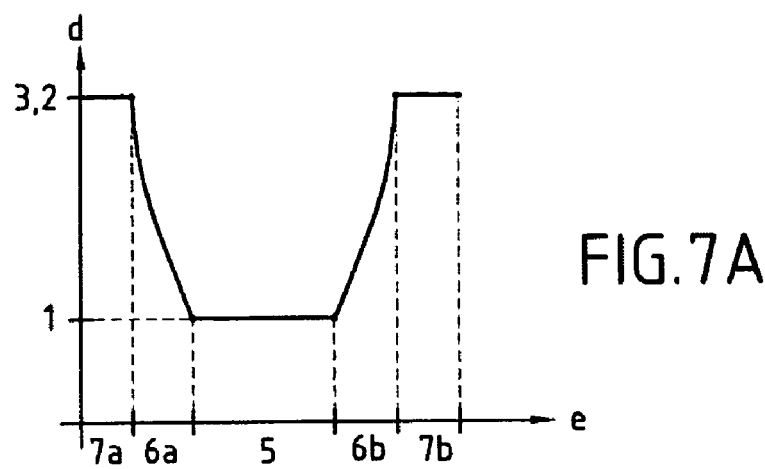
FIGS. 7A, 7B and 7C are curves showing, respectively, the variation in the density, in the silicon carbide content and the carbon content found through the thickness of the structure of FIG. 6.

The structure has a density gradient that increases from its core to its surface, as indicated by FIG. 7a that shows the variation in the density d of the structure as a function of the nature of the layers encountered through the thickness e of the structure. In the example in question, the core 5 has a mean density of 0.5 and a Young's modulus of around 1 GPa. The intermediate layer 6 has a mean density of around 2 for a Young's modulus of 200 GPa. The ceramic shell 7 has a mean density of 3.2 and a Young's modulus of 420 GPa.

Figure 7B:
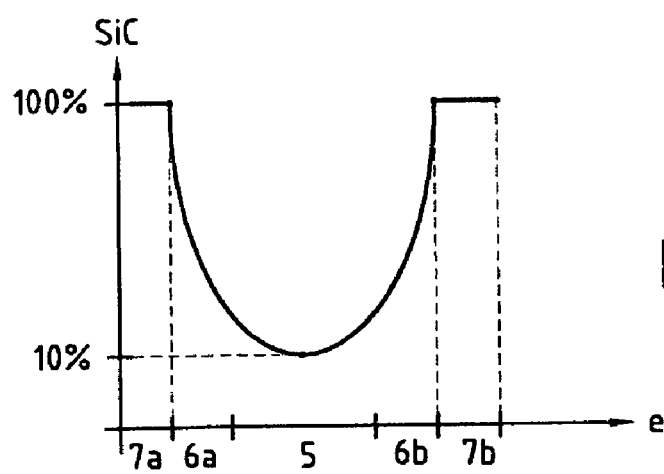
Figure 7C:
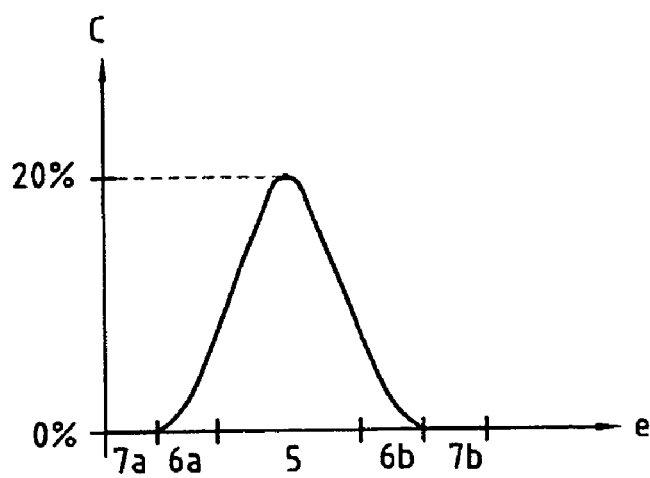

The structure obtained has a compositional gradient through the thickness e. FIGS. 7B and 7C show the variation in SiC content and in the carbon content found through the thickness e of the structure of the embodiment described here.

The structure thus obtained has a low bulk density, of less than or equal to 1, while still having a high stiffness provided by the ceramic shell. The density/stiffness pair of the structure may be adjusted by modifying the thickness of each of the layers.

The ease of machining the starting material allows complex and varied shapes to be produced without having to use special tooling. Very thin stiffeners may be produced thanks to this material selection.

Thus, the structure according to the invention allows the manufacture of very thin walls that are both stiff and light.

In the example of FIG. 2, the preform has an approximately plane surface that is intended to form an optical surface. After chemical vapor infiltration (step S7), a uniform ceramic coating of smooth appearance is obtained on the surface in question, corresponding here to the layer 7b. The surface of the layer 7b is then polished (step S8) to give it a mirror appearance. A surface finish of the order of 5 Å after polishing may be obtained.

Optionally, after the crosslinking (step S5) or the ceramification (step S6), a surface leveling operation (step S51 or S61) may be carried out in order to return to the initial geometry of the surface. The leveling may be carried out by polishing, the coating being friable at this stage in the manufacture.

Thus, according to the present invention, it is possible to produce high-performance ultralight optical mirrors that have an optical surface integrally formed with the rest of the structure, especially the stiffeners.

Figure 8:
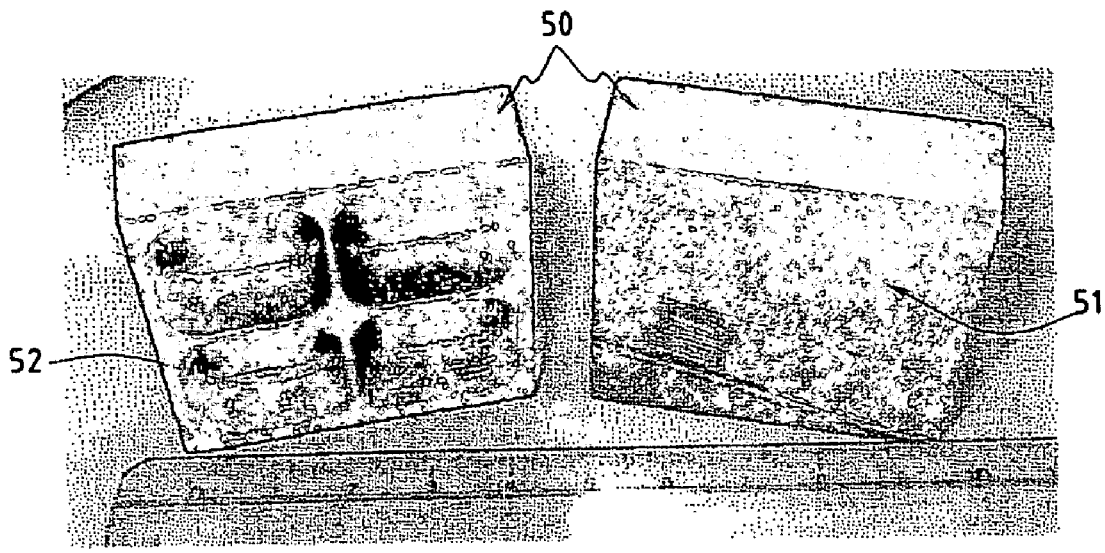
FIG. 8 is a photograph showing to scale an example of a mirror module obtained using the process of the invention.
Figure 9:
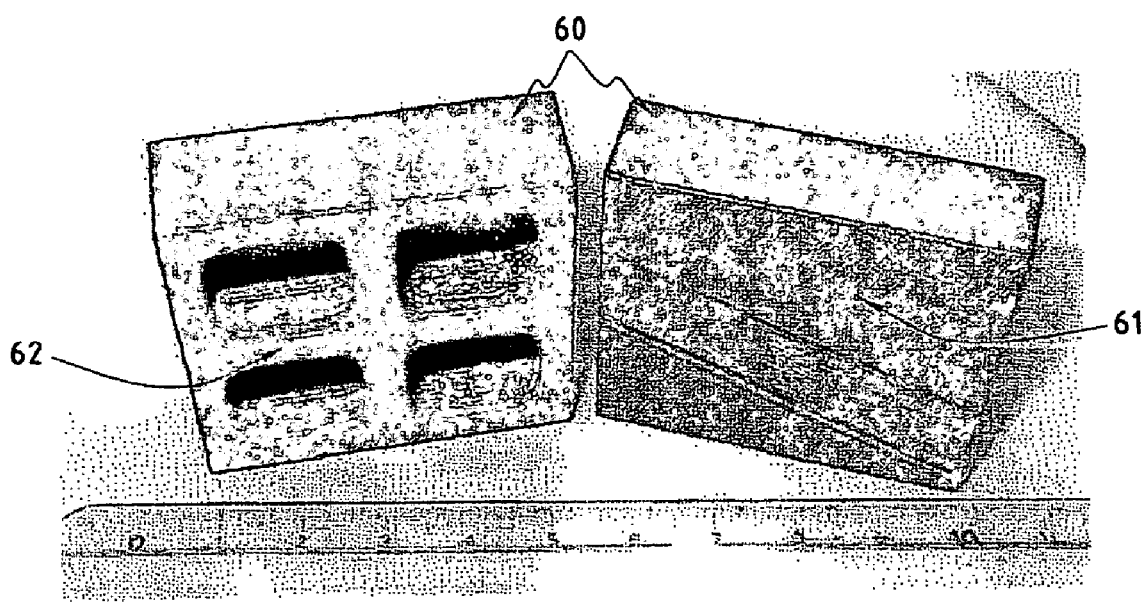
FIG. 9 is a photograph showing to scale another example of a mirror module obtained using the process of the invention.

FIGS. 8 and 9 show examples of ultralight mirrors produced using the process of the invention described above. FIG. 8 shows a first type of mirror 50 that has an optical surface 51 obtained by polishing the ceramic coating and includes, on the opposite side, simple stiffeners 52 having a thickness of about one millimeter. FIG. 9 illustrates another type of mirror 60 that also has an optical surface 61 but that differs in that it has T-shaped stiffeners 62, such as those illustrated in FIG. 5.

As an example, mirrors with a diameter of the order of one meter having a mass of only 6 kg, stiffeners included, may be produced from the structure according to the invention. Because of the high thermal conductivity conferred by the ceramic, especially SiC, shells, the deformations remain homothetic in the presence of temperature changes, guaranteeing precise guiding of the mirror despite the variable temperature operating conditions.

Figure 10:
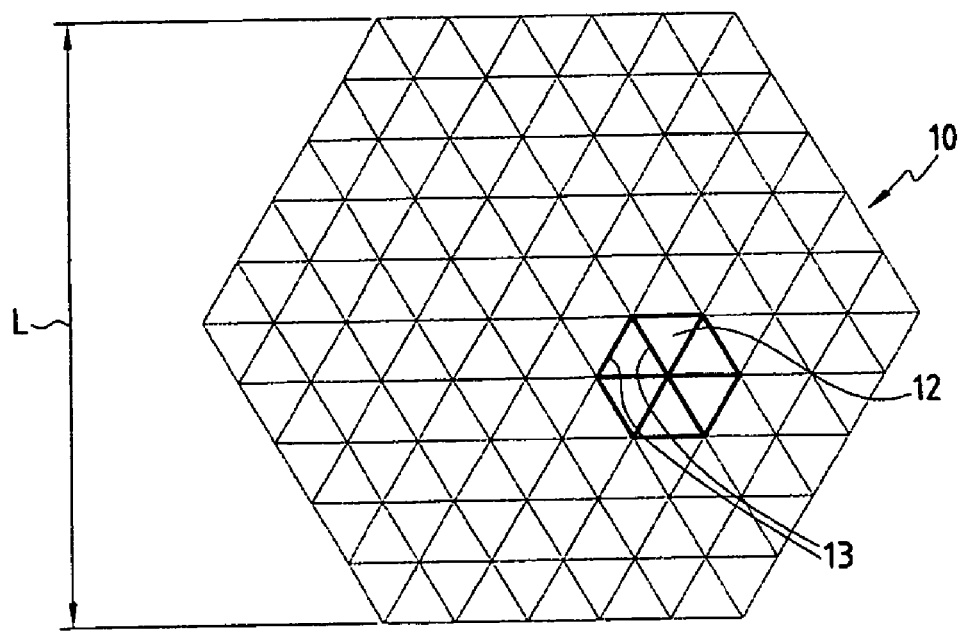
FIG. 10 is a schematic representation of a second embodiment of a structure according to the invention.

Using the same manufacturing method, very large mirrors, such as those intended for observation, may be produced. As FIG. 10 shows, such mirrors are manufactured from a structure 10 that corresponds to a multiplication of the structure shown in FIG. 2. To do this, triangular cavities 12 may be machined in order to form stiffeners 13 having a length and a thickness that are suited to the final dimensions of the mirror. Alternatively, the large mirror may be obtained by joining a number of small modules together, such as those in FIG. 2, that are fixed to one another by PCS and co-infiltration.

To give an example, it is possible to manufacture mirrors with a width L of greater than one meter, having a surfacic mass of around 8 kg/m$^2$, thereby making it possible to obtain a relatively low total weight while still having good mechanical strength despite the large dimensions.

Figure 11:
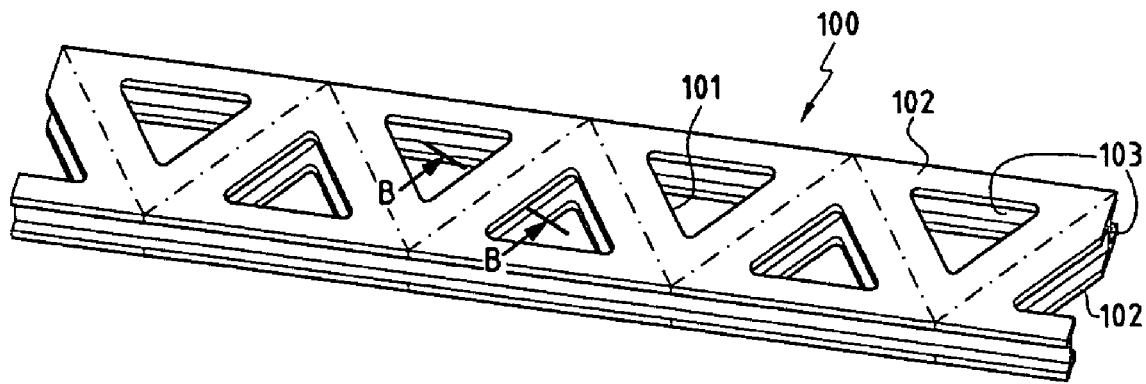
FIG. 11 is a perspective view of a third embodiment of a structure according to the invention.
Figure 12:
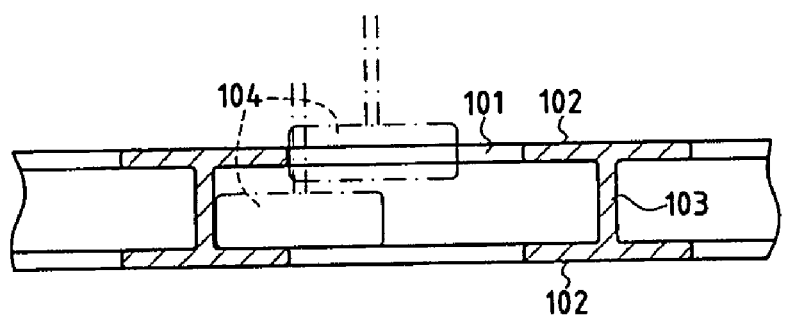
FIG. 12 is a partial sectional view of the structure of FIG. 11 showing a machining operation.

The ease of machining the starting C/C composite allows varied and complex shapes to be produced. FIGS. 11 and 12 illustrate the production of a preform 100 of a beam with a cavity structure manufactured in accordance with the structure of the invention. The machining operation consists in hollowing-out the material with a milling cutter 104 in order to form a number of triangular cavities 101 and in flaring the inside of these cavities in order to form stiffeners 103 of the type consisting of a double T 102. Thus, a lightened beam made of a material that nevertheless retains good stiffness is obtained. The next steps in the manufacture, namely application of the coating layer, drying, crosslinking, ceramification and chemical vapor infiltration, are carried out in the same way as described previously.

Many other constructions may be envisioned, such as a honeycomb construction with a hexagonal structure, for example.

Apart from its stiffness and its lightness, the structure of the present invention also has other advantages. This is because the structure is impermeable thanks to the ceramic shell that envelopes it. In addition, the structure constitutes a good thermal conductor. Consequently, the structure of the invention can be used for the manufacture of heat exchangers with walls cooled by circulation of fluid, such as, for example, nozzle wall elements of a jet engine or combustion chamber wall elements of gas turbines, or plasma confinement chamber wall elements in a nuclear fusion reactor.

Figure 13:
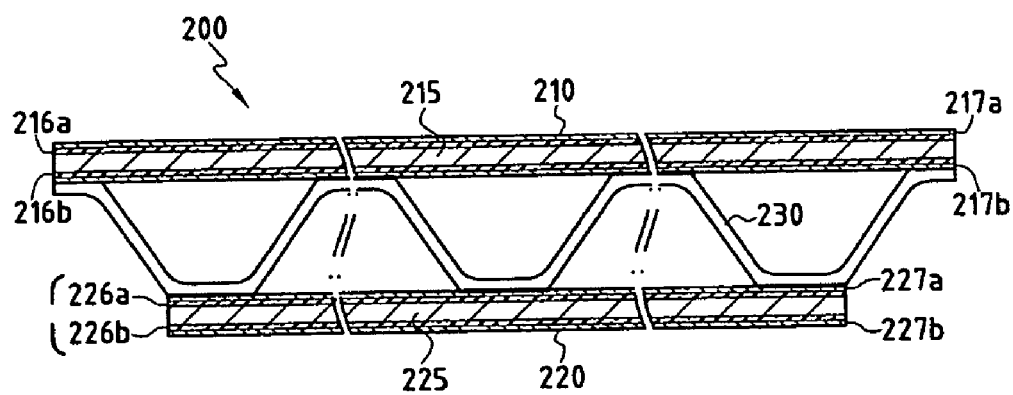
FIG. 13 is a partial sectional view of a fourth embodiment of a structure according to the invention.

FIG. 13 illustrates an example of a heat exchanger 200 that has a hot wall and a cold wall formed respectively by two panels 210 and 220 composed of the structure according to the invention. The panels 210 and 220 are coupled by a thermal conductor 230, for example made of a C/C composite, that is fixed to the panels by brazing. In accordance with the structure of the invention, each panel 210, or alternatively 220, comprises a porous core 215, or alternatively 225, sandwiched between two intermediate layers 216a and 216b, or alternatively 226a and 226b, and two ceramic shells 217a and 217b, or alternatively 227a and 227b. Because of the sealing and good temperature resistance of the material, the heat source may be confined by the panel 210, while a cooling fluid flows within the wall of the panel 220. Thus, high-performance lightweight heat exchangers are obtained.

Apart from the ceramic coating that forms the external shells of the structure according to the invention, other specific coatings may be produced depending on the envisioned applications. For example, metal-based reflective coatings or coatings that are even harder than ceramic, such as diamond, may be deposited on the structure of the invention.

The invention claimed is:

1. A thermostructural composite structure having a density gradient, formed from a porous core made of a refractory having a pore volume content of greater than or equal to 80%, said core lying between two intermediate layers comprising part of the refractory of the porous core and a ceramic phase and a refractory solid filler, and two external shells made of a ceramic covering said intermediate layers.

2. The structure as claimed in claim 1, wherein the refractory of the porous core consists of a refractory fiber reinforcement consolidated by a matrix.

3. The structure as claimed in claim 2, wherein the reinforcement comprises carbon fibers of the ex-rayon type bonded together by a carbon matrix.

4. The structure as claimed in claim 3, wherein:
   the intermediate layers are anchored on the porous core while the ceramic shells are anchored on the intermediate layers;
   said structure has a bulk density of less than 1;
   said structure includes a number of cavities having walls that form stiffeners;
   the stiffeners have a wall thickness ranging up to 1 mm;
   the stiffeners have hollowed-out portions;
   the ceramic shells are composed of silicon carbide.

5. The structure as claimed in claim 1, wherein the intermediate layers are anchored on the porous core while the ceramic shells are anchored on the intermediate layers.

6. The structure as claimed in claim 1, which has a bulk density of less than 1.

7. The structure as claimed m claim 1, which includes a number of cavities having walls that form stiffeners.

8. The structure as claimed in claim 7, wherein the stiffeners have a wall thickness ranging up to 1 mm.

9. The structure as claimed in claim 8, which includes at least one optical surface integrally formed with the stiffeners.

10. The structure as claimed in claim 7, wherein the stiffeners have hollowed-out portions.

11. The structure as claimed in claim 7, which includes at least one optical surface.

12. The structure as claimed in claim 1, wherein the ceramic is composed of silicon carbide.

* * * * *

UNITED STATES PATENT AND TRADEMARK OFFICE
CERTIFICATE OF CORRECTION

PATENT NO. : 7,063,886 B2  Page 1 of 1
APPLICATION NO. : 10/727472
DATED : June 20, 2006
INVENTOR(S) : Jacques Thebault et al.

It is certified that error appears in the above-identified patent and that said Letters Patent is hereby corrected as shown below:

Column 12, claim 7, line 11, "m" should read --in--.

Signed and Sealed this

Twenty-second Day of May, 2007

JON W. DUDAS
*Director of the United States Patent and Trademark Office*